US008741005B1

(12) United States Patent
Dadson

(10) Patent No.: US 8,741,005 B1
(45) Date of Patent: *Jun. 3, 2014

(54) SUPERABRASIVE ARTICLES AND METHODS FOR REMOVING INTERSTITIAL MATERIALS FROM SUPERABRASIVE MATERIALS

(71) Applicant: US Synthetic Corporation, Orem, UT (US)

(72) Inventor: Andrew E. Dadson, Provo, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/736,025

(22) Filed: Jan. 7, 2013

Related U.S. Application Data

(63) Continuation of application No. 13/114,599, filed on May 24, 2011, now Pat. No. 8,377,157, which is a continuation of application No. 12/419,191, filed on Apr. 6, 2009, now Pat. No. 7,972,395.

(51) Int. Cl.
*B24D 3/00* (2006.01)
*C09K 3/14* (2006.01)

(52) U.S. Cl.
USPC .................................. 51/293; 51/307; 51/309

(58) Field of Classification Search
USPC ........................................... 51/293, 307, 309
See application file for complete search history.

(56) References Cited

U.S. PATENT DOCUMENTS

| | | | |
|---|---|---|---|
| 3,136,615 A | 6/1964 | Bovenkerk et al. |
| 3,141,746 A | 7/1964 | De Lai et al. |
| 3,233,988 A | 2/1966 | Wentorf et al. |
| 3,745,623 A | 7/1973 | Wentorf, Jr. et al. |
| 4,108,614 A | 8/1978 | Mitchell |
| 4,151,686 A | 5/1979 | Lee et al. |
| 4,224,380 A | 9/1980 | Bovenkerk et al. |
| 4,255,165 A | 3/1981 | Dennis et al. |
| 4,268,276 A | 5/1981 | Bovenkerk |
| 4,288,248 A | 9/1981 | Bovenkerk et al. |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,412,980 A | 11/1983 | Tsuji et al. |
| 4,481,016 A | 11/1984 | Campbell et al. |
| 4,486,286 A | 12/1984 | Lewin et al. |
| 4,504,519 A | 3/1985 | Zelez |
| 4,522,633 A | 6/1985 | Dyer |
| 4,525,179 A | 6/1985 | Gigl |
| 4,534,773 A | 8/1985 | Phaal et al. |
| 4,556,403 A | 12/1985 | Almond et al. |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall et al. |
| 4,605,343 A | 8/1986 | Hibbs, Jr. et al. |
| 4,606,738 A | 8/1986 | Hayden |
| 4,621,031 A | 11/1986 | Scruggs |
| 4,636,253 A | 1/1987 | Nakai et al. |
| 4,645,977 A | 2/1987 | Kurokawa et al. |
| 4,662,348 A | 5/1987 | Hall et al. |
| 4,664,705 A | 5/1987 | Horton et al. |
| 4,670,025 A | 6/1987 | Pipkin |
| 4,707,384 A | 11/1987 | Schachner et al. |
| 4,726,718 A | 2/1988 | Meskin et al. |
| 4,731,296 A | 3/1988 | Kikuchi et al. |
| 4,766,040 A | 8/1988 | Hillert et al. |
| 4,776,861 A | 10/1988 | Frushour |
| 4,784,023 A | 11/1988 | Dennis |
| 4,792,001 A | 12/1988 | Zijsling |
| 4,793,828 A | 12/1988 | Burnand |
| 4,797,241 A | 1/1989 | Peterson et al. |
| 4,802,539 A | 2/1989 | Hall et al. |
| 4,807,402 A | 2/1989 | Rai |
| 4,828,582 A | 5/1989 | Frushour |
| 4,844,185 A | 7/1989 | Newton, Jr. et al. |
| 4,854,405 A | 8/1989 | Stroud |
| 4,861,350 A | 8/1989 | Phaal et al. |
| 4,871,377 A | 10/1989 | Frushour |
| 4,899,922 A | 2/1990 | Slutz et al. |
| 4,919,220 A | 4/1990 | Fuller et al. |
| 4,931,068 A | 6/1990 | Dismukes et al. |
| 4,940,180 A | 7/1990 | Martell |
| 4,943,488 A | 7/1990 | Sung et al. |
| 4,944,772 A | 7/1990 | Cho |
| 4,976,324 A | 12/1990 | Tibbitts |
| 5,011,514 A | 4/1991 | Cho et al. |
| 5,027,912 A | 7/1991 | Juergens |
| 5,030,276 A | 7/1991 | Sung et al. |
| 5,092,687 A | 3/1992 | Hall |
| 5,096,465 A | 3/1992 | Chen et al. |
| 5,116,568 A | 5/1992 | Sung et al. |
| 5,127,923 A | 7/1992 | Bunting et al. |
| 5,135,061 A | 8/1992 | Newton, Jr. |
| 5,176,720 A | 1/1993 | Martell et al. |
| 5,186,725 A | 2/1993 | Martell et al. |

(Continued)

FOREIGN PATENT DOCUMENTS

| | | |
|---|---|---|
| EP | 0196777 | 10/1986 |
| EP | 0300699 | 1/1989 |

(Continued)

OTHER PUBLICATIONS

Nakamura, T. et al; Study on the Heat Deterioration Mechanism of Sintered Diamond; Program and Abstracts of the 27th High Pressure Conference of Japan; Oct. 13-15, 1986; Sapporo.

(Continued)

*Primary Examiner* — Elizabeth Wood
(74) *Attorney, Agent, or Firm* — ALG Intellectual Property, LLC

(57) ABSTRACT

A method of processing a polycrystalline diamond material is disclosed. According to the method, a metal-solvent catalyst is leached from a polycrystalline diamond material by exposing at least a portion of the polycrystalline diamond material to a leaching composition. The leaching composition includes water, a complexing agent, and hydrofluoric acid.

21 Claims, 11 Drawing Sheets

(56) References Cited

U.S. PATENT DOCUMENTS

| | | |
|---|---|---|
| 5,199,832 A | 4/1993 | Meskin et al. |
| 5,205,684 A | 4/1993 | Meskin et al. |
| 5,213,248 A | 5/1993 | Horton et al. |
| 5,238,074 A | 8/1993 | Tibbitts et al. |
| 5,264,283 A | 11/1993 | Waldenstrom et al. |
| 5,337,844 A | 8/1994 | Tibbitts |
| 5,355,969 A | 10/1994 | Hardy et al. |
| 5,370,195 A | 12/1994 | Keshavan et al. |
| 5,379,853 A | 1/1995 | Lockwood et al. |
| 5,439,492 A | 8/1995 | Anthony et al. |
| 5,464,068 A | 11/1995 | Najafi-Sani |
| 5,468,268 A | 11/1995 | Tank et al. |
| 5,496,638 A | 3/1996 | Waldenstrom et al. |
| 5,496,639 A | 3/1996 | Connell et al. |
| 5,505,748 A | 4/1996 | Tank et al. |
| 5,510,193 A | 4/1996 | Cerutti et al. |
| 5,523,121 A | 6/1996 | Anthony et al. |
| 5,524,719 A | 6/1996 | Dennis |
| 5,560,716 A | 10/1996 | Tank et al. |
| 5,607,024 A | 3/1997 | Keith et al. |
| 5,620,302 A | 4/1997 | Garrison et al. |
| 5,620,382 A | 4/1997 | Cho et al. |
| 5,624,068 A | 4/1997 | Waldenstrom et al. |
| 5,645,617 A | 7/1997 | Frushour |
| 5,667,028 A | 9/1997 | Traux et al. |
| 5,718,948 A | 2/1998 | Ederyd et al. |
| 5,722,497 A | 3/1998 | Gum et al. |
| 5,722,499 A | 3/1998 | Nguyen et al. |
| 5,759,216 A | 6/1998 | Kanada et al. |
| 5,776,615 A | 7/1998 | Wong et al. |
| 5,833,021 A | 11/1998 | Mensa-Wilmot et al. |
| 5,875,862 A | 3/1999 | Jurewicz et al. |
| 5,897,942 A | 4/1999 | Karner et al. |
| 5,954,147 A | 9/1999 | Overstreet et al. |
| 5,979,578 A | 11/1999 | Packer |
| 6,009,963 A | 1/2000 | Chaves et al. |
| 6,063,333 A | 5/2000 | Dennis |
| 6,123,612 A | 9/2000 | Goers |
| 6,126,741 A | 10/2000 | Jones et al. |
| 6,193,001 B1 | 2/2001 | Eyre et al. |
| 6,234,261 B1 | 5/2001 | Evans et al. |
| 6,248,447 B1 | 6/2001 | Griffin et al. |
| 6,269,894 B1 | 8/2001 | Griffin |
| 6,290,726 B1 | 9/2001 | Pope et al. |
| 6,315,065 B1 | 11/2001 | Yong et al. |
| 6,332,503 B1 | 12/2001 | Pessier et al. |
| 6,344,149 B1 | 2/2002 | Oles |
| 6,367,568 B2 | 4/2002 | Steinke et al. |
| 6,410,085 B1 | 6/2002 | Griffin et al. |
| 6,435,058 B1 | 8/2002 | Matthias et al. |
| 6,481,511 B2 | 11/2002 | Matthias et al. |
| 6,528,159 B1 | 3/2003 | Kanada et al. |
| 6,544,308 B2 | 4/2003 | Griffin et al. |
| 6,550,556 B2 | 4/2003 | Middlemiss et al. |
| 6,562,462 B2 | 5/2003 | Griffin et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,662 B2 | 8/2003 | Matthias et al. |
| 6,739,214 B2 | 5/2004 | Griffin et al. |
| 6,749,033 B2 | 6/2004 | Griffin et al. |
| 6,797,326 B2 | 9/2004 | Griffin et al. |
| 6,861,098 B2 | 3/2005 | Griffin et al. |
| 6,861,137 B2 | 3/2005 | Griffin et al. |
| 6,878,447 B2 | 4/2005 | Griffin et al. |
| 6,892,836 B1 | 5/2005 | Eyre et al. |
| 6,904,984 B1 | 6/2005 | Estes et al. |
| 6,935,444 B2 | 8/2005 | Lund et al. |
| 6,962,214 B2 | 11/2005 | Hughes et al. |
| 6,991,049 B2 | 1/2006 | Eyre et al. |
| 7,350,601 B2 | 4/2008 | Belnap et al. |
| 7,377,341 B2 | 5/2008 | Middlemiss et al. |
| 7,506,698 B2 | 3/2009 | Eyre et al. |
| 7,568,534 B2 | 8/2009 | Griffin et al. |
| 2005/0115744 A1 | 6/2005 | Griffin et al. |
| 2005/0129950 A1 | 6/2005 | Griffin et al. |
| 2005/0139397 A1 | 6/2005 | Achilles et al. |
| 2005/0230156 A1 | 10/2005 | Belnap et al. |
| 2005/0263328 A1 | 12/2005 | Middlemiss |
| 2006/0060390 A1 | 3/2006 | Eyre |
| 2006/0060391 A1 | 3/2006 | Eyre et al. |
| 2006/0086540 A1 | 4/2006 | Griffin et al. |
| 2006/0162969 A1 | 7/2006 | Belnap et al. |
| 2007/0039762 A1 | 2/2007 | Achilles |
| 2007/0169419 A1 | 7/2007 | Davis et al. |
| 2007/0181348 A1 | 8/2007 | Lancaster et al. |
| 2007/0187155 A1 | 8/2007 | Middlemiss |
| 2009/0152016 A1 | 6/2009 | Eyre et al. |

FOREIGN PATENT DOCUMENTS

| | | |
|---|---|---|
| EP | 0329954 | 8/1989 |
| EP | 0500253 | 8/1992 |
| EP | 0585631 | 3/1994 |
| EP | 0595630 | 5/1994 |
| EP | 0612868 | 8/1994 |
| EP | 0617207 | 9/1994 |
| EP | 0787820 | 8/1997 |
| EP | 0860515 | 8/1998 |
| EP | 1190791 | 3/2002 |
| GB | 1349385 | 4/1974 |
| GB | 2048927 | 12/1980 |
| GB | 2268768 | 1/1994 |
| GB | 2323398 | 9/1998 |
| GB | 2418215 | 3/2006 |
| GB | 2422394 | 7/2006 |
| JP | 59-35066 | 2/1984 |
| JP | 61-67740 | 10/1984 |
| JP | 59-219500 | 12/1984 |
| JP | 61-125739 | 6/1986 |
| JP | 63-069971 | 9/1986 |
| JP | 63-55161 | 8/1987 |
| JP | 07-156003 | 11/1993 |
| JP | 07-62468 | 3/1995 |
| JP | 11-245103 | 9/1999 |
| JP | 2000-087112 | 3/2000 |
| RU | 2034937 | 5/1995 |
| RU | 566439 | 7/2000 |
| WO | WO-93/23204 | 11/1993 |
| WO | WO-96/34131 | 10/1996 |
| WO | WO-00/28106 | 5/2000 |
| WO | WO-2004/040095 | 5/2004 |
| WO | WO-2004/106003 | 12/2004 |
| WO | WO-2004/106004 | 12/2004 |

OTHER PUBLICATIONS

Hong, S. et al.; Dissolution Behavior of Fine Prticles of Diamond Under High Pressure Sintering Conditions; Jornal of Materials Science Letters 10; pp. 164-166; 1991.

SUPERABRASIVE ARTICLES AND METHODS FOR REMOVING INTERSTITIAL MATERIALS FROM SUPERABRASIVE MATERIALS

REFERENCE TO RELATED APPLICATIONS

This application is a continuation of U.S. patent application Ser. No. 13/114,599 filed 24 May 2011, which is a continuation of U.S. patent application Ser. No. 12/419,191 filed 6 Apr. 2009 (issued as U.S. Pat. No. 7,972,395 on 5 Jul. 2011), each of which is hereby incorporated by reference in its entirety.

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems.

Conventional superabrasive materials have found utility as superabrasive cutting elements in rotary drill bits, such as roller cone drill bits and fixed-cutter drill bits. A conventional cutting element typically includes a superabrasive layer or table, such as a PCD table. The PCD table is formed and bonded to a substrate using an ultra-high pressure, ultra-high temperature ("HPHT") process. The cutting element may be brazed, press-fit, or otherwise secured into a preformed pocket, socket, or other receptacle formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

Conventional superabrasive materials have also found utility as bearing elements in thrust bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, or through other suitable methods of attachment. Typically, bearing elements mounted to a bearing rotor have superabrasive faces configured to contact corresponding superabrasive faces of bearing elements mounted to an adjacent bearing stator.

Superabrasive elements having a PCD table are typically fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into a HPHT press. The substrates and diamond particles may then be processed under HPHT conditions in the presence of a catalyst material that causes the diamond particles to bond to one another to form a diamond table having a matrix of bonded diamond grains. The catalyst material is often a metal-solvent catalyst, such as cobalt, nickel, and/or iron that facilitates intergrowth and bonding of the diamond grains.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. In this example, the cobalt acts as a catalyst to facilitate the formation of bonded diamond grains. Optionally, a metal-solvent catalyst may be mixed with diamond particles prior to subjecting the diamond particles and substrate to the HPHT process.

The metal-solvent catalyst may dissolve carbon from the diamond particles and portions of the diamond particles that graphitize due to the high temperatures used in the HPHT process. The solubility of the stable diamond phase in the metal-solvent catalyst may be lower than that of the metastable graphite phase under HPHT conditions. As a result of the solubility difference, the graphite tends to dissolve into the metal-solvent catalyst and the diamond tends to deposit onto existing diamond particles to form diamond-to-diamond bonds. Accordingly, diamond grains may become mutually bonded to form a matrix of polycrystalline diamond, with interstitial regions defined between the bonded diamond grains being occupied by the metal-solvent catalyst.

In addition to dissolving diamond and graphite, the metal-solvent catalyst may also carry tungsten and/or tungsten carbide from the substrate into the PCD layer. Following HPHT sintering, the tungsten and/or tungsten carbide may remain in interstitial regions defined between the bonded diamond grains.

The presence of the solvent catalyst in the diamond table is believed to reduce the thermal stability of the diamond table at elevated temperatures. For example, the difference in thermal expansion coefficient between the diamond grains and the solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. At extremely high temperatures, portions of diamond grains may transform to carbon monoxide, carbon dioxide, graphite, or combinations thereof, thereby degrading the mechanical properties of the PCD material.

Accordingly, it may be desirable, for some applications, to remove a metal-solvent catalyst from a PCD material in situations where the PCD material may be exposed to high temperatures. Chemical leaching is often used to remove metal-solvent catalysts, such as cobalt, from regions of a PCD article that may experience high temperatures, such as regions adjacent to the working surfaces of the PCD article. Conventional chemical leaching techniques often involve the use of highly concentrated, toxic, and/or corrosive solutions, such as aqua regia and mixtures including hydrofluoric acid (HF), to dissolve and remove metal-solvent catalysts from polycrystalline diamond materials.

SUMMARY

The instant disclosure is directed to a method of processing a polycrystalline diamond material. In some examples, the method may comprise leaching a metal-solvent catalyst from a polycrystalline diamond material by exposing at least a portion of the polycrystalline diamond material to a leaching solution. The leaching solution may include water. The leaching solution may also comprise a complexing agent configured to inhibit or prevent tungsten in the polycrystalline diamond material from oxidizing. The leaching solution may additionally comprise a mineral acid.

The complexing agent may comprise a chelating agent. In one example, the complexing agent may comprise a phosphate. In an additional embodiment, the complexing agent may comprise a weak acid having an acid dissociation constant ($pK_a$) of between approximately −2 and 12. In various embodiments, the complexing agent may comprise at least one of phosphoric acid, citric acid, tartaric acid, oxalic acid, and ammonium chloride. The leaching solution may comprise the complexing agent at a molar concentration of between approximately 0.01 M and approximately 3 M. In some examples, the leaching solution may comprise the complexing agent at a molar concentration of approximately 0.125 M.

The metal-solvent catalyst may comprise at least one of cobalt, nickel, and iron. In an additional embodiment, the mineral acid may comprise at least one of nitric acid, hydrochloric acid, sulfuric acid, boric acid, and hydrofluoric acid. The leaching solution may comprise the mineral acid at a molar concentration of between approximately 0.1 M and approximately 3 M. In some examples, the leaching solution may comprise the mineral acid at a molar concentration of approximately 1.5 M. The complexing agent may be configured to form metal complexes with the tungsten. The metal complexes may be soluble in the leaching solution. Each of the metal complexes may comprise a tungsten atom and between 2 and 4 ligands.

The leaching solution may further comprise a peroxide. In one example, the polycrystalline diamond material may comprise bonded diamond grains. At least a portion of the tungsten and at least a portion of the metal-solvent catalyst may be disposed between the bonded diamond grains.

In an additional embodiment, the method may comprise exposing at least a portion of the polycrystalline diamond material and the leaching solution to a temperature of between approximately 25° C. and approximately 280° C. The method may additionally comprise exposing at least a portion of the polycrystalline diamond material and the leaching solution to a pressure of between approximately 20 bar and approximately 100 bar. In one example, the method may comprise exposing at least a portion of the polycrystalline diamond material and the leaching solution to at least one of an electric current, microwave radiation, and ultrasonic energy. The method may further comprise separating the polycrystalline diamond material from the leaching solution when the polycrystalline diamond material is substantially free of the metal-solvent catalyst to a depth of between approximately 100 μm and approximately 2500 μM.

In one embodiment, a method of processing a superabrasive element may comprise providing a superabrasive element. The superabrasive element may comprise a substrate and a polycrystalline diamond table bonded to the substrate. The polycrystalline diamond table may comprise tungsten and a metal-solvent catalyst. According to the method, at least a portion of the metal-solvent catalyst may be leached from the polycrystalline diamond table by exposing at least a portion of the polycrystalline diamond table to a leaching solution.

An additional method of processing a polycrystalline diamond material may comprise providing a polycrystalline diamond material. The polycrystalline diamond material may comprise bonded diamond grains, tungsten, and a metal-solvent catalyst. The method may further comprise forming metal complexes within the polycrystalline diamond material. The metal complexes may comprise at least a portion of the tungsten and a complexing agent. The method may also comprise dissolving at least a portion of the metal-solvent catalyst in a mineral acid solution. Additionally, the method may comprise extracting the dissolved metal-solvent catalyst from the polycrystalline diamond material.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
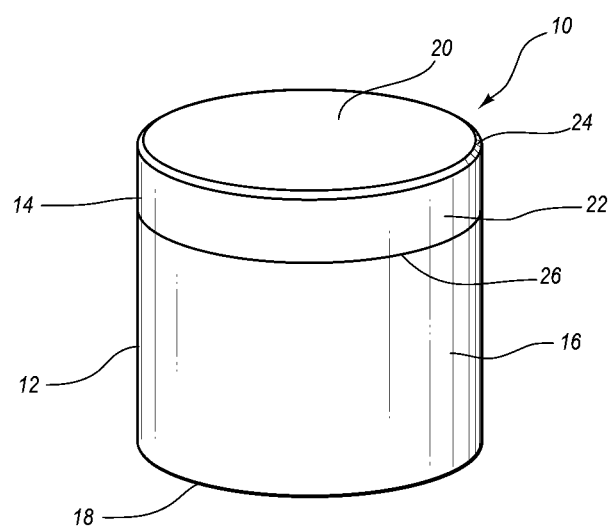
FIG. 1 is a perspective view of an exemplary superabrasive element according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to methods of processing superabrasive articles, such as superabrasive cutting elements, superabrasive bearings, and superabrasive discs. The superabrasive articles disclosed herein may be used in a variety of applications, such as drilling tools (e.g., compacts, cutting elements, gage trimmers, etc.), machining equipment, bearing apparatuses, wire-drawing machinery, and other apparatuses.

As used herein, the terms "superabrasive" and "superhard" may refer to materials exhibiting a hardness exceeding a hardness of tungsten carbide. For example, a superabrasive article may represent an article of manufacture, at least a portion of which may exhibit a hardness exceeding the hardness of tungsten carbide. Additionally, the term "solvent," as used herein, may refer to a single solvent compound, a mixture of two or more solvent compounds, and/or a mixture of one or more solvent compounds and one or more dissolved compounds. The term "molar concentration," as used herein, may refer to a concentration in units of mol/L at a temperature of approximately 25° C. For example, a solution comprising solute A at a molar concentration of 1 M may comprise 1 mol of solute A per liter of solution. Moreover, the word "cutting" may refer broadly to machining processes, drilling processes, boring processes, or any other material removal process utilizing a cutting element.

FIG. 1 is a perspective view of an exemplary superabrasive element 10 according to at least one embodiment. As illustrated in FIG. 1, superabrasive element 10 may comprise a layer or table 14 affixed to or formed upon a substrate 12. Superabrasive element 10 may comprise a rear face 18 and a substrate side surface 16 formed by substrate 12. Superabrasive element 10 may also comprise a superabrasive face 20 and a superabrasive side surface 22 formed by table 14. Superabrasive table 14 may be affixed to substrate 12 at interface 26.

Substrate 12 may comprise any suitable material on which table 14 may be formed. In at least one embodiment, substrate 12 may comprise a cemented carbide material, such as a cobalt-cemented tungsten carbide material or any other suitable material. In some embodiments, substrate 12 may include a suitable metal-solvent catalyst material, such as, for example, cobalt, nickel, iron, and/or alloys thereof. Generally, substrate 12 may include any suitable material including, without limitation, cemented carbides such as titanium carbide, niobium carbide, tantalum carbide, vanadium carbide, and/or combinations of any of the preceding carbides cemented with iron, nickel, cobalt, and/or alloys thereof.

Table 14 may be formed of any suitable superabrasive and/or superhard material or combination of materials, including, for example PCD. According to additional embodiments, table 14 may comprise cubic boron nitride, silicon carbide, diamond, and/or mixtures or composites including one or more of the foregoing materials.

Table 14 may be formed using any suitable technique. For example, table 14 may comprise a PCD layer formed by subjecting a plurality of diamond particles (e.g., diamond particles having an average particle size between approximately 0.5 µm and approximately 150 µm) to a HPHT sintering process in the presence of a metal-solvent catalyst, such as cobalt, nickel, iron, and/or any other suitable group VIII element. During a HPHT sintering process, adjacent diamond grains in a mass of diamond particles may become bonded to one another, forming a PCD table comprising bonded diamond grains. In one example, diamond grains in table 14 may have an average grain size of approximately 20 µm or less. Additionally, during a HPHT sintering process, diamond grains may become bonded to an adjacent substrate 12 at interface 26.

According to various embodiments, table 14 may be formed by placing diamond particles adjacent to a substrate 12 comprising cemented tungsten carbide. The resulting sintered PCD layer may include tungsten and/or tungsten carbide. For example, tungsten and/or tungsten carbide may be swept into the PCD layer from substrate 12 during HPHT sintering. In some examples, a liquefied metal-solvent catalyst from substrate 12 (e.g., cobalt from a cobalt-cemented tungsten carbide substrate) may dissolve and/or carry tungsten and/or tungsten carbide from substrate 12 into a diamond mass used to form table 14 during HPHT sintering. In additional examples, tungsten and/or tungsten carbide particles may be intentionally mixed with diamond particles prior to forming table 14.

Figure 2:
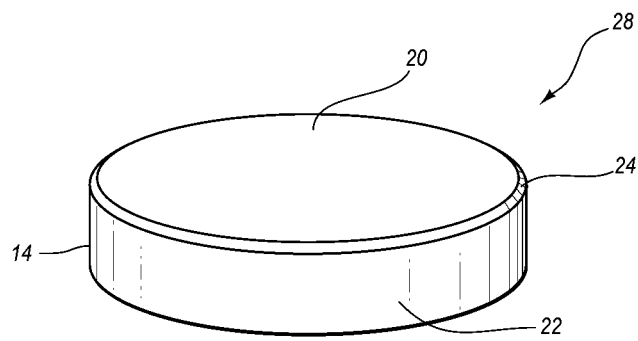
FIG. 2 is a perspective view of an exemplary superabrasive disc according to at least one embodiment.

FIG. 2 is a perspective view of an exemplary superabrasive disc 28 according to at least one embodiment. As illustrated in FIG. 2, superabrasive disc 28 may comprise a superabrasive table 14 that is not attached to a substrate. Superabrasive disc 28 may be formed using any suitable technique, including, for example, HPHT sintering, as described above. In some examples, superabrasive disc 28 may be created by first forming a superabrasive element 10 that includes a substrate 12 and a superabrasive table 14, as detailed above in reference to FIG. 1. Once superabrasive element 10 has been produced, superabrasive table 14 may be separated from substrate 12 to form superabrasive disc 28. For example, superabrasive table 14 may be separated from substrate 12 using a lapping process, a grinding process, a wire-electrical-discharge machining ("wire EDM") process, or any other suitable material-removal process, without limitation.

Figure 3A:
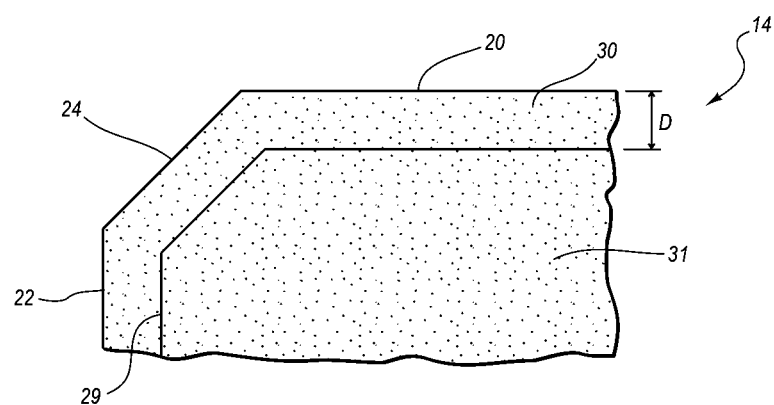
FIG. 3A is a cross-sectional side view of a portion of a superabrasive table according to at least one embodiment.

FIG. 3A is a cross-sectional side view of a portion of an exemplary superabrasive table 14, such as the superabrasive tables 14 illustrated in FIGS. 1 and 2. Superabrasive table 14 may comprise a composite material, such as a PCD material. A PCD material may include a matrix of bonded diamond grains and interstitial regions defined between the bonded diamond grains. Such interstitial regions may be at least partially filled with various materials. In some embodiments, a metal-solvent catalyst may be disposed in interstitial regions in superabrasive table 14. Tungsten and/or tungsten carbide may also be present in the interstitial regions.

According to various embodiments, materials may be deposited in interstitial regions during processing of superabrasive table 14. For example, material components of substrate 12 may migrate into a mass of diamond particles used to form a superabrasive table 14 during HPHT sintering. As the mass of diamond particles is sintered, a metal-solvent catalyst may melt and flow from substrate 12 into the mass of diamond particles. As the metal-solvent flows into superabrasive table 14, it may dissolve and/or carry additional materials, such as tungsten and/or tungsten carbide, from substrate 12 into the mass of diamond particles. As the metal-solvent catalyst flows into the mass of diamond particles, the metal-solvent catalyst, and any dissolved and/or undissolved materials, may at least partially fill spaces between the diamond particles. The metal-solvent catalyst may facilitate bonding of adjacent diamond particles to form a PCD layer. Following sintering, any materials, such as, for example, the metal-solvent catalyst, tungsten, and/or tungsten carbide, may remain in interstitial regions within superabrasive table 14.

To improve the performance and heat resistance of a surface of superabrasive table 14, at least a portion of a metal-solvent catalyst, such as cobalt, may be removed from at least a portion of superabrasive table 14. Additionally, tungsten and/or tungsten carbide may be removed from at least a portion of superabrasive table 14. A metal-solvent catalyst, as well as other materials, may be removed from superabrasive table 14 using any suitable means, without limitation.

For example, chemical leaching may be used to remove a metal-solvent catalyst from superabrasive table 14 up to a depth D from a surface of superabrasive table 14, as illustrated in FIG. 3A. As shown in FIG. 3A, depth D may be measured relative to an external surface of superabrasive table 14, such as superabrasive face 20, superabrasive side surface 22, and/or superabrasive edge 24. In some examples, a metal-solvent catalyst may be removed from superabrasive table 14 up to a depth D of approximately 2500 µm. In additional examples, a metal-solvent catalyst may be removed from superabrasive table 14 up to a depth D of between approximately 100 and 1000 µm.

Following leaching, superabrasive table 14 may comprise a first volume 30 that is substantially free of a metal-solvent catalyst. However, small amounts of catalyst may remain within interstices that are inaccessible to the leaching process. First volume 30 may extend from one or more surfaces of superabrasive table 14 (e.g., superabrasive face 20, superabrasive side surface 22, and/or superabrasive edge 24) to a depth D from the one or more surfaces. First volume 30 may be located adjacent one or more surfaces of superabrasive table 14.

Following leaching, superabrasive table may also comprise a second volume 31 that contains a metal-solvent catalyst. An amount of metal-solvent catalyst in second volume 31 may be substantially the same prior to and following leaching. In various embodiments, second volume 31 may be remote from one or more exposed surfaces of superabrasive table 14. In various embodiments, an amount of metal-solvent catalyst in first volume 30 and/or second volume 31 may vary at different depths in superabrasive table 14.

In at least one embodiment, superabrasive table 14 may include a transition region 29 between first volume 30 and second volume 31. Transition region 29 may include amounts of metal-solvent catalyst varying between an amount of metal-solvent catalyst in first volume 30 and an amount of metal-solvent catalyst in second volume 31. In various examples, transition region 29 may comprise a relatively narrow region between first volume 30 and second volume 31.

Figure 3B:
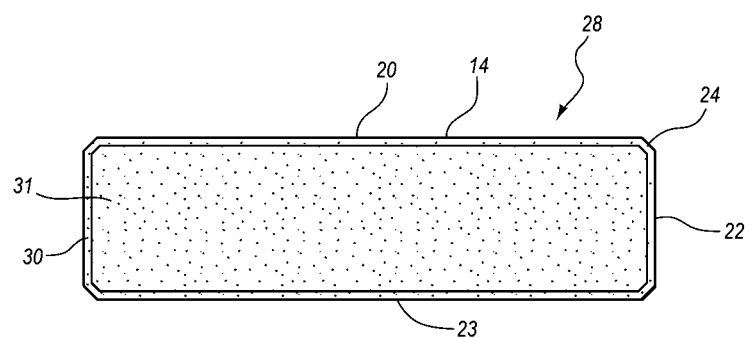
FIG. 3B is a cross-sectional side view of a superabrasive disc according to at least one embodiment.

FIG. 3B is a cross-sectional side view of a superabrasive disc 28, such as the superabrasive disc 28 illustrated in FIG. 2. As shown in FIG. 3B, superabrasive disc 28 may comprise a superabrasive table 14 having a superabrasive face 20, a superabrasive side surface 22, a rear superabrasive face 23, and superabrasive edges 24. As described above in reference to FIG. 3A, a metal-solvent catalyst, as well as other materials, may be removed from at least a portion of superabrasive disc 28. Accordingly, superabrasive disc 28 may comprise a first volume 30 that is substantially free of a metal-solvent catalyst and a second volume 31 that contains a metal-solvent catalyst. As described above, small amounts of catalyst may remain within interstices that are inaccessible to the leaching process in first volume 30.

In at least one example, as shown in FIG. 3B, first volume 30 may extend around a substantial exterior portion of superabrasive disc 28. For example, superabrasive disc 28 may be submerged in a leaching solution so that superabrasive face 20, superabrasive side surface 22, rear superabrasive face 23, and superabrasive edges 24 are exposed to the leaching solution, resulting in a first volume 30 that extends substantially around superabrasive disc 28. In some examples, only a portion of superabrasive disc 28 may be exposed to a leaching solution, resulting in a first volume 30 that extends around only a portion of superabrasive disc 28.

Figure 4:
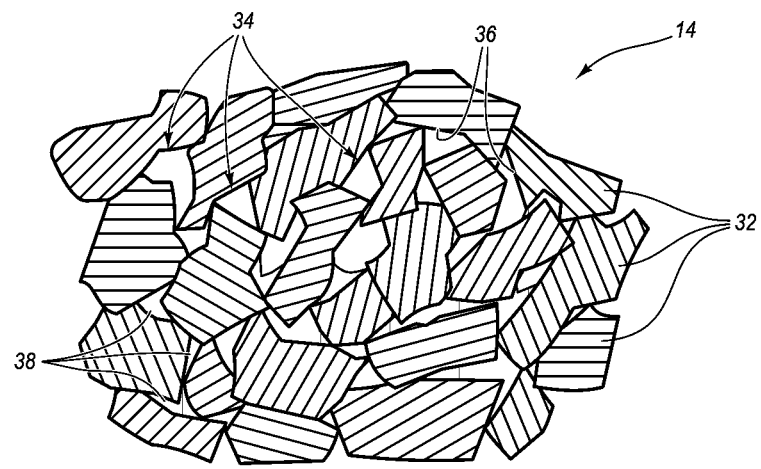
FIG. 4 is a magnified cross-sectional side view of a portion of a superabrasive table according to at least one embodiment.

FIG. 4 is a magnified cross-sectional side view of a portion of the superabrasive table 14 illustrated in FIG. 3A. As shown in FIG. 4, superabrasive table 14 may comprise grains 32 and interstitial regions 34 between grains 32 defined by grain surfaces 36. Grains 32 may comprise grains formed of any suitable superabrasive material, including, for example, diamond grains. At least some of grains 32 may be bonded to one or more adjacent grains 32, forming a polycrystalline diamond matrix.

Interstitial material 38 may be disposed in at least some of interstitial regions 34. Interstitial material 38 may comprise any suitable material, such as, for example, a metal-solvent catalyst, tungsten, and/or tungsten carbide. As shown in FIG. 4, interstitial material 38 may not be present in at least some of interstitial regions 34. At least a portion of interstitial material 38 may be removed from at least some of interstitial regions 34 during a leaching procedure. For example, a substantial portion of interstitial material 38 may be removed from first volume 30 during a leaching procedure. Additionally interstitial material 38 may remain in a second volume 31 following a leaching procedure.

In some examples, interstitial material 38 may be removed from table 14 to a depth that improves the performance and heat resistance of a surface of superabrasive table 14 to a desired degree. In some embodiments, interstitial material 38 may be removed from superabrasive table 14 to a practical limit. In order to remove interstitial material 38 from superabrasive table 14 to a depth beyond the practical limit, for example, significantly more time, temperature, and/or pressure may be required. In some embodiments, interstitial material 38 may be removed from superabrasive table 14 to a practical limit where interstitial material remains in at least a portion of superabrasive table 14. In various embodiments, superabrasive table 14 may be fully leached so that interstitial material 38 is substantially removed from a substantial portion of superabrasive table 14.

In at least one embodiment, interstitial material 38 may be leached from a superabrasive material, such as a PCD material in superabrasive table 14, by exposing the superabrasive material to a suitable leaching solution. Interstitial material 38 may include a metal-solvent catalyst, such as cobalt. Relatively less concentrated and/or corrosive solutions may be inhibited from leaching a PCD article to a sufficient depth due to the formation of passive tungsten oxide films in the PCD material as tungsten in the PCD material oxidizes. Oxygen present in various solutions may facilitate the formation of tungsten oxides, examples of which include $WO_2$, $W_2O_5$, and $WO_3$. The tungsten oxide films may inhibit dissolution of metal-solvent catalysts present in PCD materials, potentially slowing and hindering leaching of the PCD materials. Additionally, the tungsten oxide films may form a barrier that inhibits penetration of solutions beyond a certain depth into the PCD materials.

A suitable leaching solution may inhibit or prevent formation of oxide compounds, such as tungsten oxides, thereby potentially facilitating leaching of PCD materials. According to at least one embodiment, a leaching solution may comprise a solvent, a complexing agent, and a mineral acid. The superabrasive material may be exposed to such a leaching solution in any suitable manner, including, for example, by immersing at least a portion of the superabrasive material in the leaching solution.

The solvent in such a leaching solution may comprise water and/or any other suitable solvent, without limitation. In additional embodiments, the leaching solution may also include a peroxide, such as hydrogen peroxide.

The leaching solution may comprise a mineral acid suitable for increasing the solubility of a metal-solvent catalyst with respect to the leaching solution. The mineral acid may be selected for its ability to attack and/or dissolve the metal-solvent catalyst. The leaching solution may then carry the dissolved metal-solvent catalyst out of a PCD material comprising the metal-solvent catalyst. In some examples, a suitable mineral acid may be configured to increase the solubility of the cobalt in the leaching mixture, thereby facilitating leaching of cobalt from a superabrasive material using the leaching mixture. In additional examples, a mineral acid may be configured to increase the solubility of iron and/or nickel in the leaching mixture.

In various embodiments, nitric acid may be used as a mineral acid in the leaching solution. In some embodiments, a mineral acid, such as nitric acid, may also react with amorphous carbon present in interstitial regions 34 between diamond grains 32 in a superabrasive table 14 comprising a PCD material. Additional examples of suitable mineral acids may include, for example, hydrochloric acid, sulfuric acid, boric acid, hydrofluoric acid, and/or any combination of the foregoing mineral acids.

A mineral acid may be present in the leaching solution at a molar concentration of between approximately 0.1 M and approximately 3 M. In some examples, a mineral acid may be present in the leaching solution at a molar concentration of between approximately 1 M and approximately 2 M. In at least one example, a mineral acid may be present in the leaching solution at a molar concentration of approximately 1.5 M.

The leaching solution may additionally comprise a complexing agent dissolved in the solvent. The complexing agent may comprise a compound suitable for forming metal complexes with tungsten and/or tungsten carbide. The complexing agent may form metal complexes with tungsten and/or tungsten carbide present in a superabrasive material, thereby inhibiting or preventing the formation and build up of tungsten oxides, such as $WO_2$, $W_2O_5$, and $WO_3$, in the superabrasive material.

In at least one embodiment, metal complexes formed using the complexing agent may comprise a tungsten atom and between two and four ligands. For example, the complexing agent may comprise phosphoric acid. The phosphoric acid may at least partially dissociate in the leaching solution into various phosphate ions, such as, for example, dihydrogen phosphate, hydrogen phosphate, and/or orthophosphate. The phosphate ions may act as ligands in the metal complexes. In at least one embodiment, phosphate ligands may bond with a tungsten atom to form a metal complex comprising the tungsten atom and between two and four phosphate ligands surrounding the tungsten atom. The metal complexes may at least partially passivate the tungsten atom, inhibiting oxidation of the tungsten atom. Accordingly, the metal complexes may inhibit the formation of tungsten oxide films.

Metal complexes formed between the complexing agent and tungsten and/or tungsten carbide may be soluble in the leaching solution, thereby enabling the metal complexes to be easily removed from the superabrasive material. Accordingly, the complexing agent may facilitate the removal of tungsten and/or tungsten carbide from a leached portion of a superabrasive material, thereby reducing the amount of residual tungsten, tungsten carbide, and/or tungsten oxide present in a leached region of the superabrasive material. The complexing agent may also facilitate removal of additional metal compounds that may be present in the superabrasive material.

By inhibiting the formation and build up of tungsten oxides in a superabrasive material, the complexing agent may enable the leaching solution to dissolve and remove a metal-solvent catalyst from a greater portion of a superabrasive material in comparison with leaching solutions that do not include a complexing agent. Additionally, the complexing agent may enable a metal-solvent catalyst to be removed from a greater portion of a superabrasive material in a relatively shorter period of time. The complexing agent may also enable a metal-solvent catalyst to be leached from a superabrasive material using a less corrosive acid solution in comparison with conventional leaching solutions. Further, the leaching solution comprising the complexing agent may provide more uniform leaching of the superabrasive material.

According to at least one embodiment, the complexing agent may comprise a chelating agent. In at least one embodiment, the complexing agent may comprise a phosphate. Additionally, the complexing agent may comprise a weak acid having an acid dissociation constant ($pK_a$) of between approximately −2 and 12. In one example, phosphoric acid may be used as the complexing agent. Additional examples of suitable compounds that may be used as complexing agents include, without limitation, citric acid, tartaric acid, oxalic acid, ammonium chloride, and/or any combination of the foregoing.

A complexing agent may be present in the leaching solution at a molar concentration of between approximately 0.01 M and approximately 3 M. In some examples, a complexing agent may be present in the leaching solution at a molar concentration of between approximately 0.05 M and approximately 0.5 M. In at least one example, a complexing agent may be present in the leaching solution at a molar concentration of approximately 0.125M.

According to various embodiments, a superabrasive material may be exposed to the leaching solution at an elevated temperature and/or pressure. Exposing the superabrasive material to an elevated temperature and/or pressure during leaching may increase the depth to which the superabrasive material may be leached. Additionally, exposing the superabrasive material to an elevated temperature and/or pressure during leaching may decrease an amount of time required to leach the superabrasive material to a desired degree.

In various examples, at least a portion of a superabrasive material and the leaching solution may be exposed to a temperature of between approximately 25° C. and approximately 280° C. during leaching. According to additional embodiments, at least a portion of a superabrasive material and the leaching solution may be exposed to a temperature of between approximately 60° C. and approximately 240° C. during leaching. A leaching solution comprising a relatively higher amount of hydrogen peroxide may be exposed to a temperature of approximately 80° C. or less.

In various embodiments, at least a portion of a superabrasive material and a leaching solution may be exposed to a pressure of between approximately 0 bar and approximately 100 bar during leaching. In additional embodiments, at least a portion of a superabrasive material and a leaching solution may be exposed to a pressure of between approximately 20 bar and approximately 80 bar during leaching. In at least one example, at least a portion of a superabrasive material and a leaching solution may be exposed to a pressure of approximately 50 bar during leaching.

According to additional embodiments, at least a portion of a superabrasive material and a leaching solution may be exposed to at least one of an electric current, microwave radiation, and/or ultrasonic energy. By exposing at least a portion of a superabrasive material to an electric current, microwave radiation, and/or ultrasonic energy as the superabrasive material is exposed to a leaching solution, the rate at which the superabrasive material is leached may be increased.

Figure 5:
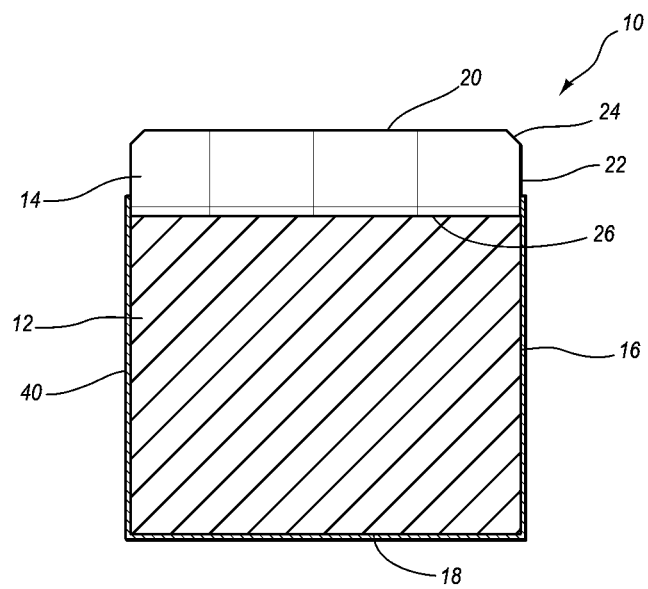
FIG. 5 is a cross-sectional side view of an exemplary superabrasive element that is at least partially surrounded by a protective layer according to at least one embodiment.

FIG. 5 is a cross-sectional side view of an exemplary superabrasive element 10 that is at least partially surrounded by a protective layer 40 according to at least one embodiment. As shown in FIG. 5, at least a portion of superabrasive element 10, including substrate 12, may be surrounded by protective layer 40. According to various embodiments, protective layer 40 may comprise an inert cup. Protective layer 40 may prevent a leaching solution from chemically damaging certain portions of superabrasive element 10, such as, for example, substrate 12, a portion of superabrasive table 14, or both, during leaching. Protective layer 40 may be selectively formed over substrate 12 and a selected portion of superabrasive table 14 in any pattern, design, or as otherwise desired, without limitation. Such a configuration may provide selective leaching of superabrasive table 14, which may be beneficial. Following leaching of superabrasive table 14, protective layer 40 may be removed from superabrasive element 10.

Figure 6:
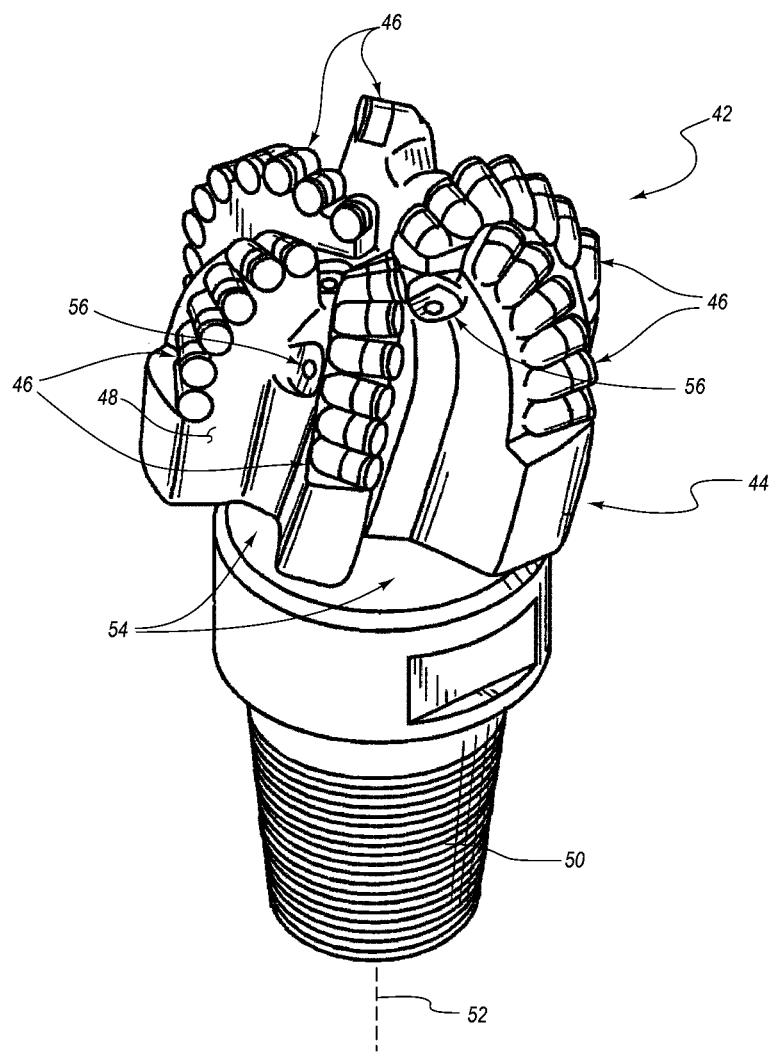
FIG. 6 is a perspective view of an exemplary drill bit according to at least one embodiment.
Figure 7:
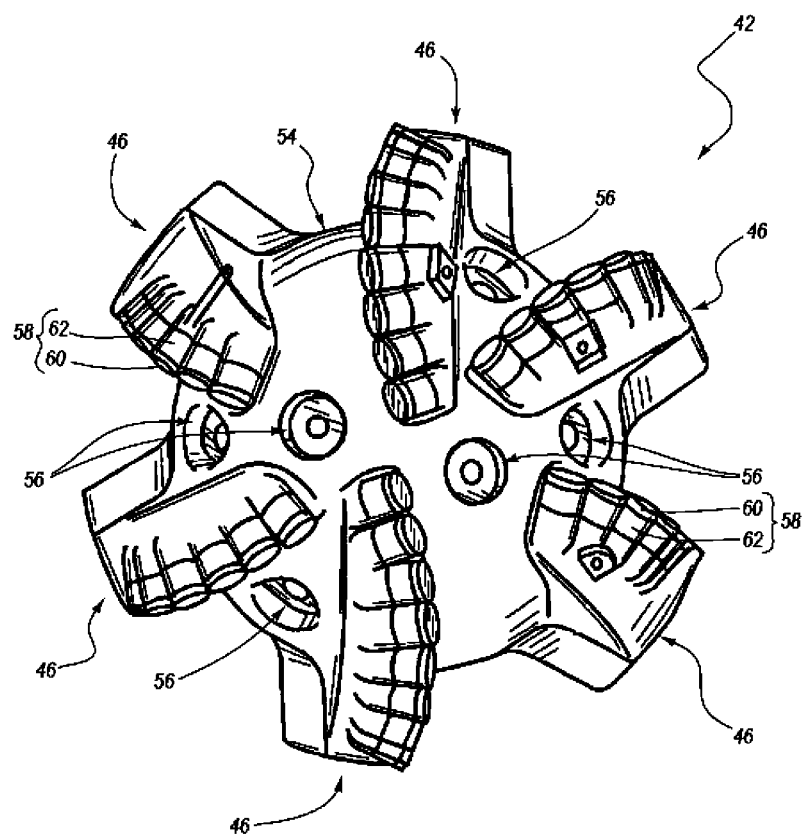
FIG. 7 is a top view of the exemplary drill bit illustrated in FIG. 6.

FIGS. 6 and 7 are a perspective view and a top view, respectively, of an exemplary drill bit 42 according to at least one embodiment. Drill bit 42 may represent any type or form of earth-boring or drilling tool, including, for example, a rotary drill bit.

Figure 8:
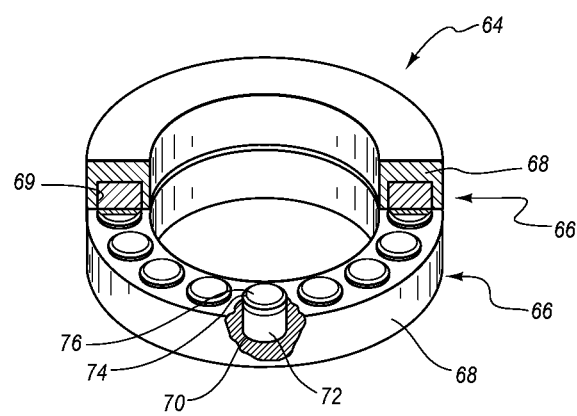
FIG. 8 is a partial cut-away perspective view of an exemplary thrust bearing apparatus according to at least one embodiment.

As illustrated in FIGS. 7 and 8, drill bit 42 may comprise a bit body 44 having a longitudinal axis 52. Bit body 44 may define a leading end structure for drilling into a subterranean formation by rotating bit body 44 about longitudinal axis 52 and applying weight to bit body 44. Bit body 44 may include radially and longitudinally extending blades 46 with leading faces 48 and a threaded pin connection 50 for connecting bit body 44 to a drill string.

At least one cutting element 58 may be coupled to bit body 44. For example, as shown in FIG. 7, a plurality of cutting elements 58 may be coupled to blades 46. Cutting elements 58 may comprise any suitable superabrasive cutting elements, without limitation. In at least one embodiment, cutting elements 58 may be configured according to previously described superabrasive element 10 and/or superabrasive disc 28. For example, each cutting element 58 may include a superabrasive table 60, such as a PCD table, bonded to a substrate 62.

Circumferentially adjacent blades 46 may define so-called junk slots 54 therebetween. Junk slots 54 may be configured to channel debris, such as rock or formation cuttings, away from cutting elements 58 during drilling. Rotary drill bit 42 may also include a plurality of nozzle cavities 56 for communicating drilling fluid from the interior of rotary drill bit 42 to cutting elements 58.

FIGS. 6 and 7 depict an example of a rotary drill bit 42 that employs at least one cutting element 58 comprising a superabrasive table 60 fabricated and structured in accordance with the disclosed embodiments, without limitation. Rotary drill bit 42 may additionally represent any number of earth-boring tools or drilling tools, including, for example, core bits, roller-cone bits, fixed-cutter bits, eccentric bits, bicenter bits, reamers, reamer wings, or any other downhole tool including superabrasive cutting elements and discs, without limitation.

The superabrasive elements and discs disclosed herein may also be utilized in applications other than cutting technology. For example, embodiments of superabrasive elements disclosed herein may also form all or part of heat sinks, wire dies, bearing elements, cutting elements, cutting inserts (e.g., on a roller cone type drill bit), machining inserts, or any other article of manufacture as known in the art. Thus, superabrasive elements and discs, as disclosed herein, may be employed in any suitable article of manufacture that includes a superabrasive element, disc, or layer. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

In additional embodiments, a rotor and a stator, such as a rotor and a stator used in a thrust bearing apparatus, may each include at least one superabrasive element according to the embodiments disclosed herein. For an example, U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements as disclosed herein.

FIG. 8 is partial cross-sectional perspective view of an exemplary thrust-bearing apparatus 64 according to at least one embodiment. Thrust-bearing apparatus 64 may utilize any of the disclosed superabrasive element embodiments as bearing elements 70. Thrust-bearing apparatus 64 may also include bearing assemblies 66. Each bearing assembly 66 may include a support ring 68 fabricated from a material, such as steel, stainless steel, or any other suitable material, without limitation.

Each support ring 68 may include a plurality of recesses 69 configured to receive corresponding bearing elements 70. Each bearing element 70 may be mounted to a corresponding support ring 68 within a corresponding recess 69 by brazing, welding, press-fitting, using fasteners, or any another suitable mounting technique, without limitation. One or more of bearing elements 70 may be configured in accordance with any of the disclosed superabrasive element embodiments. For example, each bearing element 70 may include a substrate 72 and a superabrasive table 74 comprising a PCD material. Each superabrasive table 74 may form a bearing surface 76.

Bearing surfaces 76 of one bearing assembly 66 may bear against opposing bearing surfaces 76 of a corresponding bearing assembly 66 in thrust-bearing apparatus 64, as illustrated in FIG. 8. For example, a first bearing assembly 66 of thrust-bearing apparatus 64 may be termed a "rotor." The rotor may be operably coupled to a rotational shaft. A second bearing assembly 66 of thrust-bearing apparatus 64 may be held substantially stationary relative to the first bearing assembly 66 and may be termed a "stator."

Figure 9:
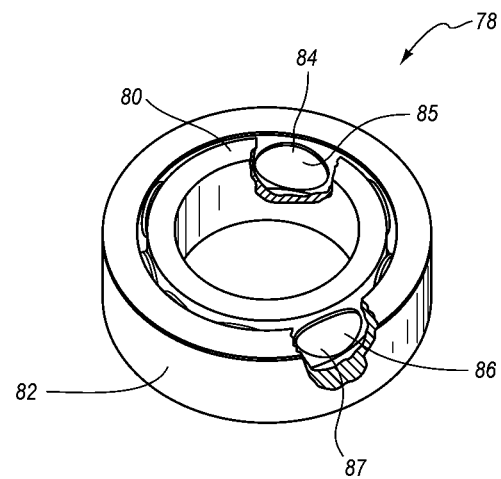
FIG. 9 is a partial cut-away perspective view of an exemplary radial bearing apparatus according to at least one embodiment.

FIG. 9 is a perspective view of a radial bearing apparatus 78 according to another embodiment. Radial bearing apparatus 78 may utilize any of the disclosed superabrasive element embodiments as bearing elements 84 and 86. Radial bearing apparatus 78 may include an inner race 80 positioned generally within an outer race 82. Inner race 80 may include a plurality of bearing elements 84 affixed thereto, and outer race 80 may include a plurality of corresponding bearing elements 86 affixed thereto. One or more of bearing elements 84 and 86 may be configured in accordance with any of the superabrasive element embodiments disclosed herein.

Inner race 80 may be positioned generally within outer race 82. Thus, inner race 80 and outer race 82 may be configured such that bearing surfaces 85 defined by bearing elements 84 and bearing surfaces 87 defined by bearing elements 86 may at least partially contact one another and move relative to one another as inner race 80 and outer race 82 rotate relative to each other. According to various embodiments, thrust-bearing apparatus 64 and/or radial bearing apparatus 78 may be incorporated into a subterranean drilling system.

Figure 10:
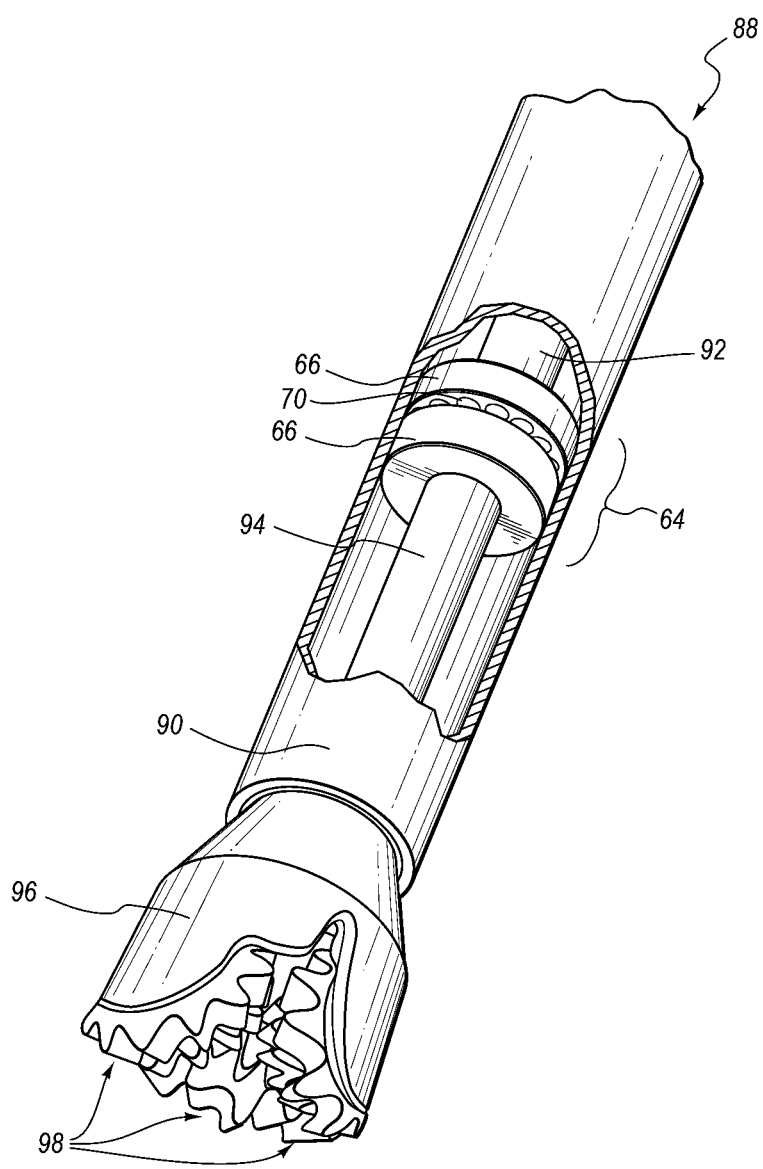
FIG. 10 is a partial cut-away perspective view of an exemplary subterranean drilling system according to at least one embodiment.

FIG. 10 is a partial cross-sectional perspective view of an exemplary subterranean drilling system 88 that includes a thrust-bearing apparatus 64, as shown in FIG. 8, according to at least one embodiment. The subterranean drilling system 88 may include a housing 90 enclosing a downhole drilling motor 92 (i.e., a motor, turbine, or any other suitable device capable of rotating an output shaft, without limitation) that is operably connected to an output shaft 94.

The thrust-bearing apparatus 64 shown in FIG. 10 may be operably coupled to downhole drilling motor 92. A rotary drill bit 96, such as a rotary drill bit configured to engage a subterranean formation and drill a borehole, may be connected to output shaft 94. As illustrated in FIG. 10, rotary drill bit 96 may be a roller cone bit comprising a plurality of roller cones 98. According to additional embodiments, rotary drill bit 96 may comprise any suitable type of rotary drill bit, such as, for example, a so-called fixed-cutter drill bit. As a borehole is drilled using rotary drill bit 96, pipe sections may be connected to subterranean drilling system 88 to form a drill string capable of progressively drilling the borehole to a greater depth within a subterranean formation.

A first thrust-bearing assembly 66 in thrust-bearing apparatus 64 may be configured as a rotor that is attached to output shaft 94 and a second thrust-bearing assembly 66 in thrust-bearing apparatus 64 may be configured as a stator. During a drilling operation using subterranean drilling system 88, the rotor may rotate in conjunction with output shaft 94 and the stator may remain substantially stationary relative to the rotor.

According to various embodiments, drilling fluid may be circulated through downhole drilling motor 92 to generate torque and effect rotation of output shaft 94 and rotary drill bit 96 attached thereto so that a borehole may be drilled. A portion of the drilling fluid may also be used to lubricate opposing bearing surfaces of bearing elements 70 on thrust-bearing assemblies 66.

Figure 11:
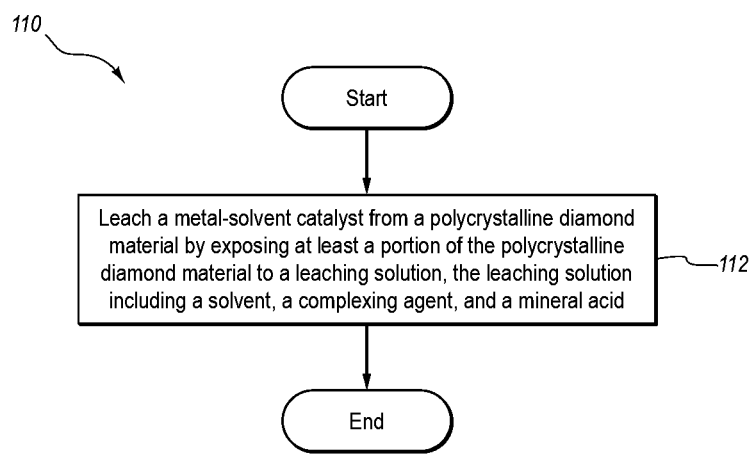
FIG. 11 is a flow diagram of an exemplary method of processing a polycrystalline superabrasive material according to at least one embodiment.

FIG. 11 illustrates an exemplary method 100 of processing a polycrystalline diamond material according to at least one embodiment. As shown in FIG. 11, a metal-solvent catalyst may be leached from a polycrystalline diamond material by exposing at least a portion of the polycrystalline diamond material to a leaching solution (step 102).

The leaching solution may include a solvent, a complexing agent, and a mineral acid. According to some examples, the solvent may comprise water. Additionally, the complexing agent may be configured to inhibit tungsten in the polycrystalline diamond material from oxidizing. Each of the complexing agent and the mineral acid may be dissolved in the solvent. The polycrystalline diamond material may be exposed to the leaching solution in any suitable manner, such as, for example, by submerging at least a portion of the polycrystalline diamond material in the leaching solution.

A polycrystalline diamond material may comprise at least a portion of any suitable polycrystalline diamond article. For example, the polycrystalline material may comprise a PCD table attached to a tungsten carbide substrate in a superabrasive element or a superabrasive disc (e.g., superabrasive element 10 and superabrasive disc 28 in FIGS. 1 and 2, respectively). The polycrystalline diamond material may include bonded diamond grains and interstitial regions between the bonded diamond grains (e.g., grains 32 and interstitial regions 34 in FIG. 4). Additionally, tungsten, tungsten carbide, and/or a metal-solvent catalyst, such as cobalt, nickel, iron, and/or any suitable group VIII element, may be disposed in at least some of the interstitial regions between the bonded diamond grains. The leaching solution may remove at least a portion of a metal-solvent catalyst, tungsten, and/or tungsten carbide from the polycrystalline diamond material to form a volume in the polycrystalline diamond material from which a metal-solvent catalyst has been substantially removed (e.g., first volume 30 in FIG. 3A).

Figure 12:
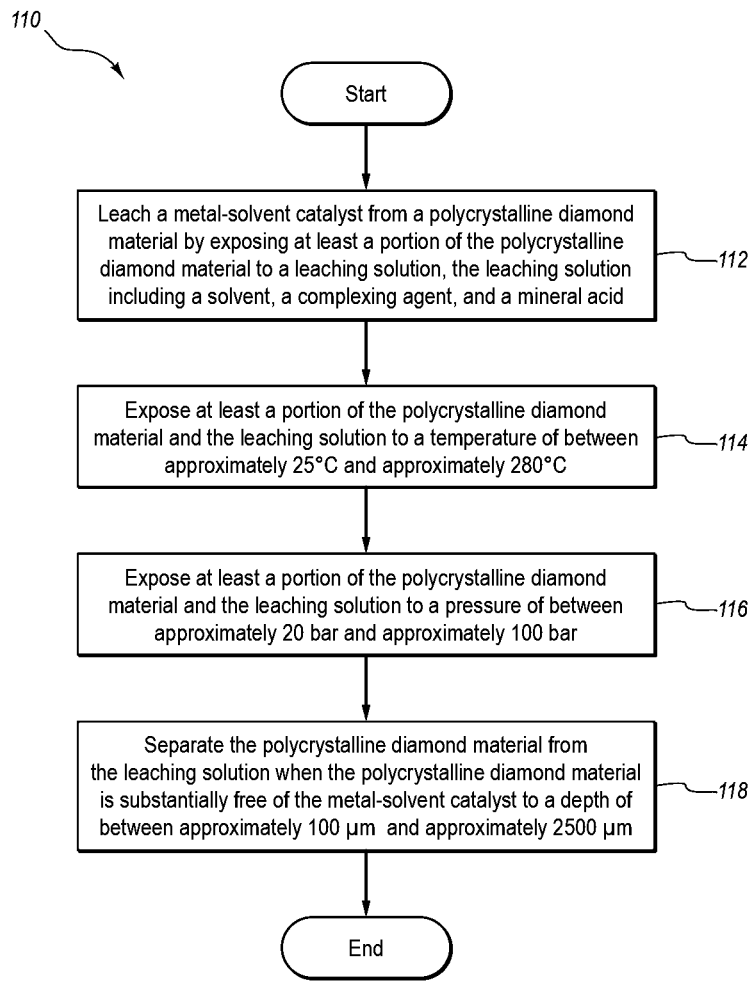
FIG. 12 is a flow diagram of an exemplary method of processing a polycrystalline superabrasive element according to certain embodiments.

FIG. 12 illustrates an exemplary method 110 of processing a polycrystalline diamond material according to additional embodiments. As shown in FIG. 12, a metal-solvent catalyst may be leached from a polycrystalline diamond material by exposing at least a portion of the polycrystalline diamond material to a leaching solution (step 112). The leaching solution may include a solvent, a complexing agent, and a mineral acid.

At least a portion of the polycrystalline diamond and the leaching solution material may be exposed to a temperature of between approximately 25° C. and approximately 280° C. (step 114). Additionally, at least a portion of the polycrystalline diamond material and the leaching solution may be exposed to a pressure of between approximately 20 bar and approximately 100 bar (step 116).

When the polycrystalline diamond material is substantially free of the metal-solvent catalyst to a depth of between approximately 100 μm and approximately 2500 μm, the polycrystalline diamond material may be separated from the leaching solution (step 118). For example, a polycrystalline diamond material that is submerged in a leaching solution may be removed from the leaching solution. Additionally, the leaching solution may be at least partially washed from the polycrystalline diamond material.

Figure 13:
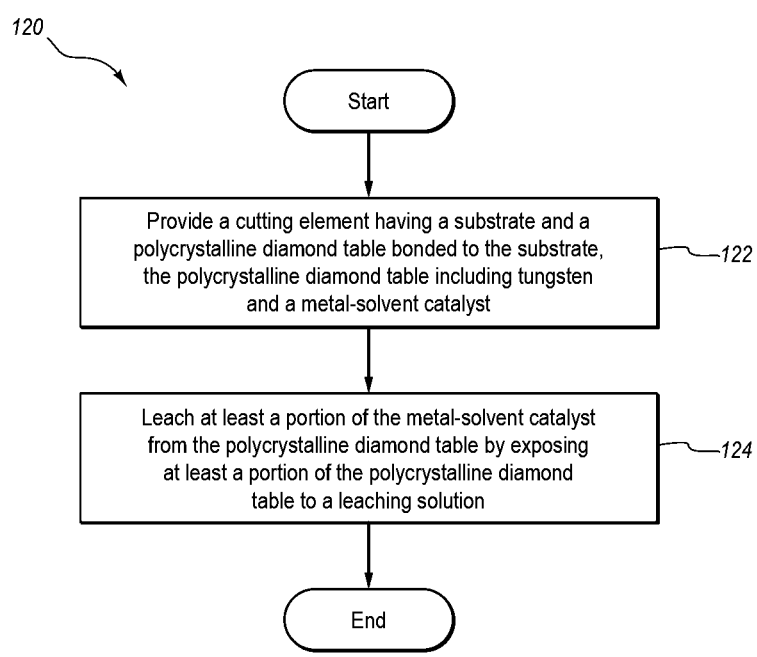
FIG. 13 is a flow diagram of an exemplary method of processing a superabrasive element according to additional embodiments.

FIG. 13 illustrates an exemplary method 120 of processing a polycrystalline diamond material according to various embodiments. As shown in FIG. 13, a cutting element having a substrate and a polycrystalline diamond table bonded to the substrate may be provided (step 122). The polycrystalline diamond table may include tungsten and a metal-solvent catalyst. The tungsten may be present in the form of elemental tungsten and/or tungsten carbide. The polycrystalline diamond table may include a metal-solvent catalyst, including, for example, cobalt, iron, nickel, and/or any other suitable group VIII element.

At least a portion of the metal-solvent catalyst may be leached from the polycrystalline diamond table by exposing at least a portion of the polycrystalline diamond table to a leaching solution (step 124). The leaching solution may include a solvent, a complexing agent, and a mineral acid.

Figure 14:
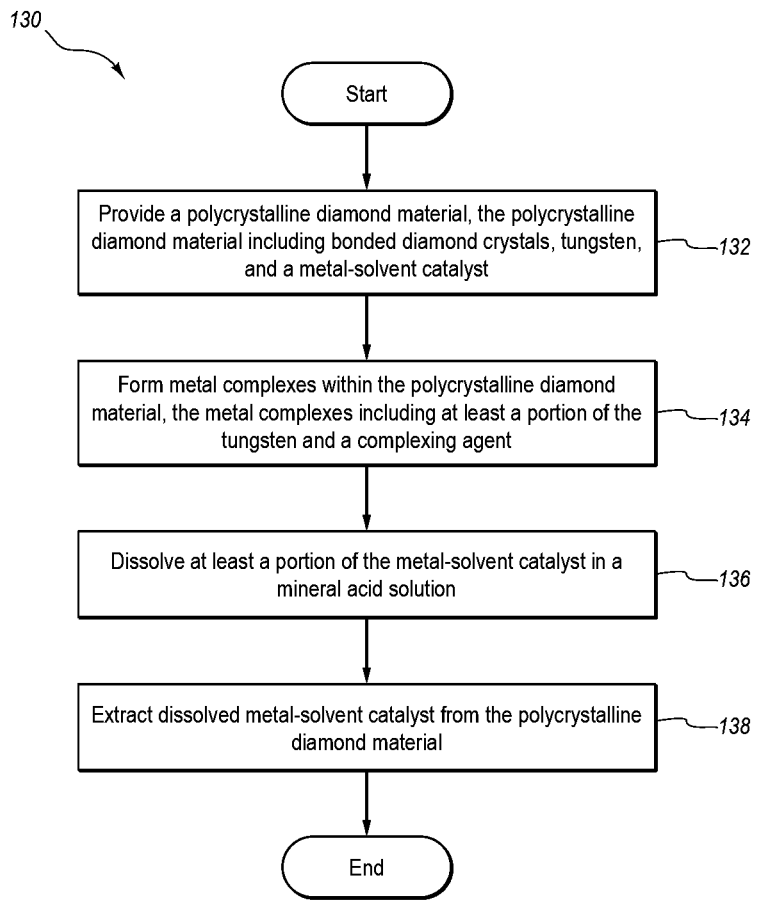
FIG. 14 is a flow diagram of an exemplary method of processing a polycrystalline superabrasive material according to additional embodiments.

FIG. 14 illustrates an exemplary method 130 of processing a polycrystalline diamond material according to certain embodiments. As shown in FIG. 14, a polycrystalline diamond material including bonded diamond grains, tungsten, and a metal-solvent catalyst may be provided (step 132).

Metal complexes may be formed within the polycrystalline diamond material (step 134). The metal complexes may include at least a portion of the tungsten from the polycrystalline diamond material and a complexing agent. The tungsten may be present in the form of elemental tungsten and/or tungsten carbide.

At least a portion of the metal-solvent catalyst may be dissolved in a mineral acid solution (step 136). The dissolved metal-solvent catalyst may then be extracted from the polycrystalline diamond material (step 138). For example, the metal-solvent catalyst dissolved in the mineral acid solution may be transported away from the polycrystalline diamond material by the mineral acid solution.

The following examples set forth various methods used to form superabrasive elements as disclosed herein. The following examples provide further detail in connection with the specific embodiments described above.

EXAMPLE 1

Cutting elements, each comprising a PCD table attached to a tungsten carbide substrate, were formed by HPHT sintering diamond particles having an average grain size of about 10 μm in the presence of cobalt. The sintered-polycrystalline-diamond tables included cobalt and tungsten within the interstitial regions between the bonded diamond grains.

The PCD tables were leached using a solution having a molar concentration of 1.5 M nitric acid and 0.125 M phosphoric acid. The PCD tables were leached at a temperature of 60° C. and atmospheric pressure for between 1 and 5 days. Following leaching, leached depths of the PCD tables were determined for various portions of the PCD tables, including leached depths measured from the cutting faces, side surfaces, and chamfered cutting edges of the PCD tables.

Following 1 day of leaching, a first PCD table included leached depths of 81-118 μm and a second PCD table included leached depths of 107-133 μm.

Following 2 days of leaching, a first PCD table included leached depths of 145-169 μm and a second PCD table included leached depths of 140-179 μm.

Following 3 days of leaching, a first PCD table included leached depths of 199-234 μm and a second PCD table included leached depths of 190-215 μm.

Following 4 days of leaching, a first PCD table included leached depths of 215-259 μm and a second PCD table included leached depths of 198-245 μm.

Following 5 days of leaching, a first PCD table included leached depths of 237-303 μm and a second PCD table included leached depths of 238-286 μm.

EXAMPLE 2

Cutting elements, each comprising a PCD table attached to a tungsten carbide substrate, were formed by HPHT sintering diamond particles having an average grain size of about 10 μm in the presence of cobalt. The sintered-polycrystalline-diamond tables included cobalt and tungsten within the interstitial regions between the bonded diamond grains.

The PCD tables were leached using a solution having a molar concentration of 1.5 M nitric acid and 0.125 M phosphoric acid. The PCD tables were leached at a temperature of 75° C. and atmospheric pressure for between 1 and 2 days. Following leaching, leached depths of the PCD tables were determined for various portions of the PCD tables, including leached depths measured from the cutting faces, side surfaces, and chamfered cutting edges of the PCD tables.

Following 1 day of leaching, a PCD table included leached depths of 105-156 μm. Following 2 days of leaching, a PCD table included leached depths of 193-238 μm.

EXAMPLE 3

A cutting element comprising a PCD table attached to a tungsten carbide substrate was formed by HPHT sintering diamond particles having an average grain size of about 10 μm in the presence of cobalt. The sintered-polycrystalline-diamond table included cobalt and tungsten within the interstitial regions between the bonded diamond grains.

The PCD table was leached using a solution having a molar concentration of 1.5 M nitric acid and 0.125 M phosphoric acid. The PCD table was leached at a temperature of 120° C. and atmospheric pressure for 5 days.

Following leaching, leached depths of the PCD table were determined for various portions of the PCD table, including leached depths measured from the table cutting face, side surfaces, and chamfered cutting edges of the PCD table. Following 5 days of leaching, the PCD table included leached depths of 160-585 μm.

The preceding description has been provided to enable others skilled the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method of processing a polycrystalline diamond material, the method comprising:
   leaching a metal-solvent catalyst from a polycrystalline diamond material by exposing at least a portion of the polycrystalline diamond material to a leaching composition, the leaching composition comprising:
     water;
     a complexing agent at a molar concentration of between approximately 0.01 M and approximately 0.5 M;
     hydrofluoric acid.

2. The method of claim 1, wherein the complexing agent comprises a chelating agent.

3. The method of claim 1, wherein the complexing agent comprises a phosphate.

4. The method of claim 1, wherein the complexing agent comprises a weak acid having an acid dissociation constant (pKa) of between approximately −2 and 12.

5. The method of claim 1, wherein the complexing agent comprises at least one of:
   phosphoric acid;
   citric acid;
   tartaric acid;
   oxalic acid;
   ammonium chloride.

6. The method of claim 1, wherein the leaching composition comprises the complexing agent at a molar concentration of approximately 0.125 M.

7. The method of claim 1, wherein the metal-solvent catalyst comprises at least one of:
   cobalt;
   nickel;
   iron.

8. The method of claim 1, wherein the leaching composition further comprises at least one of:
   nitric acid;
   hydrochloric acid;
   sulfuric acid;
   boric acid.

9. The method of claim 1, wherein the leaching composition comprises the hydrofluoric acid at a molar concentration of between approximately 0.1 M and approximately 3 M.

10. The method of claim 1, wherein the leaching composition comprises the hydrofluoric acid at a molar concentration of approximately 1.5 M.

11. The method of claim 1, wherein the leaching composition further comprises a peroxide.

12. The method of claim 1, wherein the complexing agent forms metal complexes with tungsten.

13. The method of claim 12, wherein the metal complexes are soluble in the leaching composition.

14. The method of claim 12, wherein each of the metal complexes comprises:
- a tungsten atom:
- between 2 and 4 ligands.

15. The method of claim 1, wherein:
- the polycrystalline diamond material comprises bonded diamond grains;
- at least a portion of tungsten in the polycrystalline diamond material and at least a portion of the metal-solvent catalyst are disposed between the bonded diamond grains.

16. The method of claim 1, further comprising exposing at least a portion of the polycrystalline diamond material and the leaching composition to a temperature of between approximately 25° C. and approximately 280° C.

17. The method of claim 1, further comprising exposing at least a portion of the polycrystalline diamond material and the leaching composition to a pressure of between approximately 20 bar and approximately 100 bar.

18. The method of claim 1, further comprising exposing at least a portion of the polycrystalline diamond material and the leaching composition to at least one of:
- an electric current;
- microwave radiation;
- ultrasonic energy.

19. A method of processing a superabrasive element, the method comprising:
- providing a superabrasive element comprising:
  - a substrate;
  - a polycrystalline diamond table bonded to the substrate, the polycrystalline diamond table comprising tungsten and a metal-solvent catalyst;
- leaching at least a portion of the metal-solvent catalyst from the polycrystalline diamond table by exposing at least a portion of the polycrystalline diamond table to a leaching composition, the leaching composition comprising:
  - water;
  - a complexing agent at a molar concentration of between approximately 0.01 M and approximately 0.5 M;
  - hydrofluoric acid.

20. A method of processing a polycrystalline diamond material, the method comprising:
- providing a polycrystalline diamond material, the polycrystalline diamond material comprising:
  - bonded diamond grains;
  - tungsten;
  - a metal-solvent catalyst;
- exposing the polycrystalline diamond material to a leaching composition, the leaching composition comprising:
  - water;
  - a complexing agent at a molar concentration of between approximately 0.01 M and approximately 0.5 M;
  - hydrofluoric acid;
- forming metal complexes within the polycrystalline diamond material, the metal complexes comprising:
  - at least a portion of the tungsten;
  - at least a portion of the complexing agent;
- extracting the metal-solvent catalyst from the polycrystalline diamond material.

21. The method of claim 1, wherein the leaching composition comprises the hydrofluoric acid at a molar concentration of between approximately 1 M and approximately 2 M.

* * * * *